Nov. 18, 1969   V. C. JONES   3,479,665
SELF-CONTAINED ACCELERATION CONTROL MECHANISM
Filed April 10, 1969   3 Sheets-Sheet 1
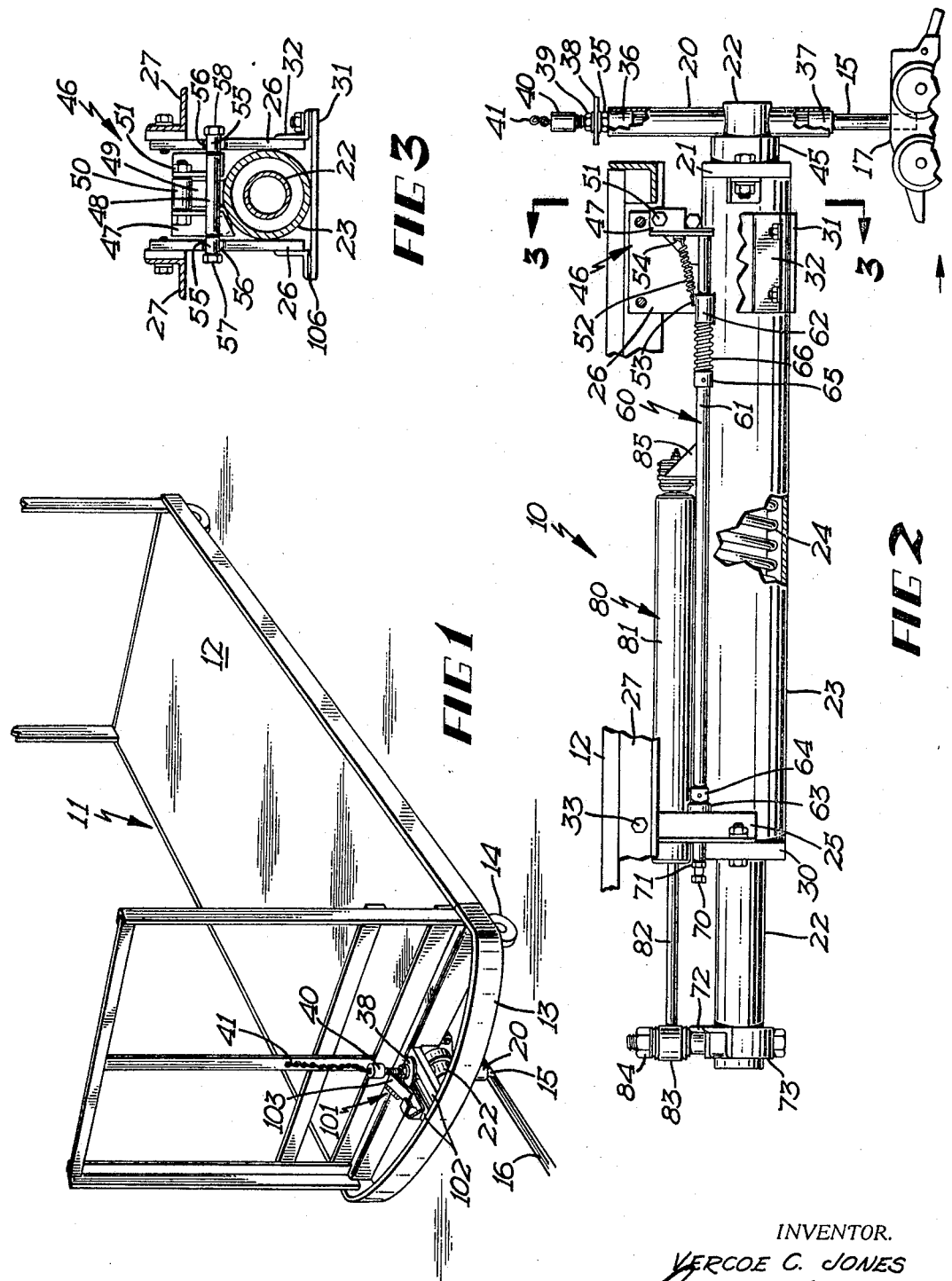
INVENTOR.
VERCOE C. JONES
BY
ATTORNEY

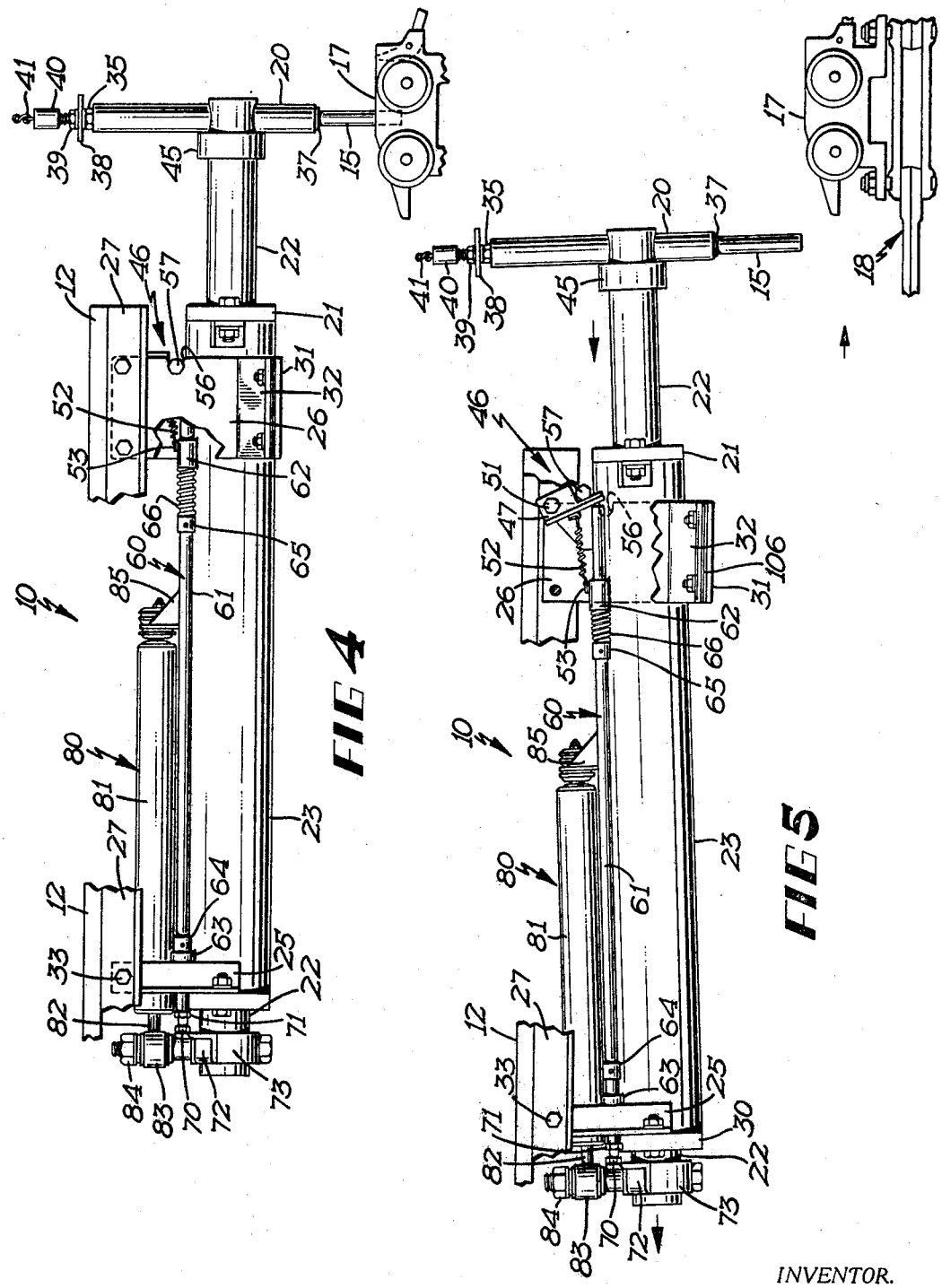

Nov. 18, 1969 V. C. JONES 3,479,665
SELF-CONTAINED ACCELERATION CONTROL MECHANISM
Filed April 10, 1969 3 Sheets-Sheet 3
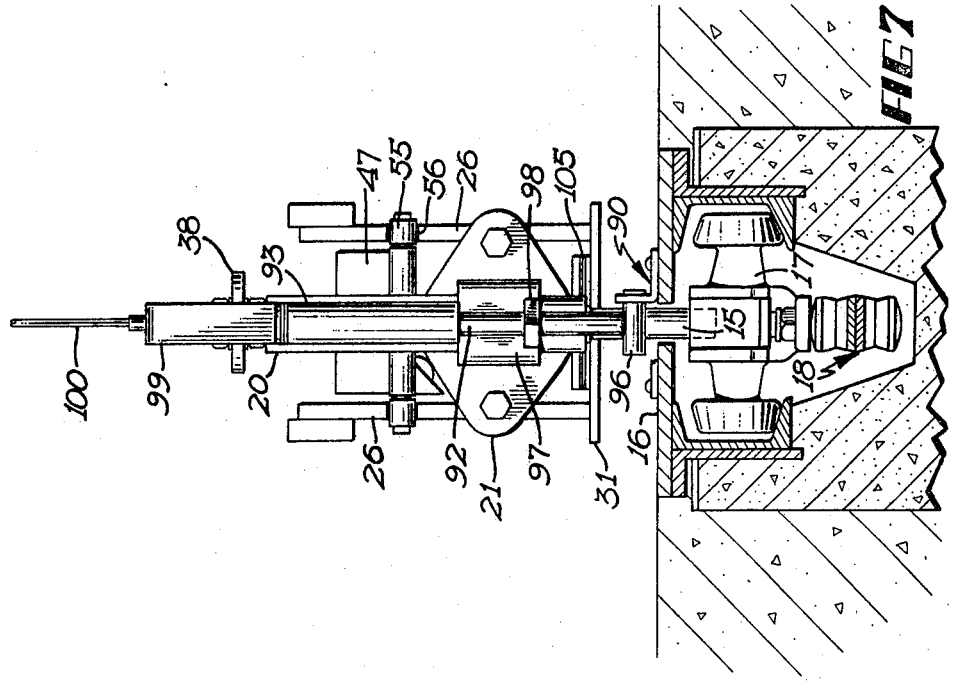
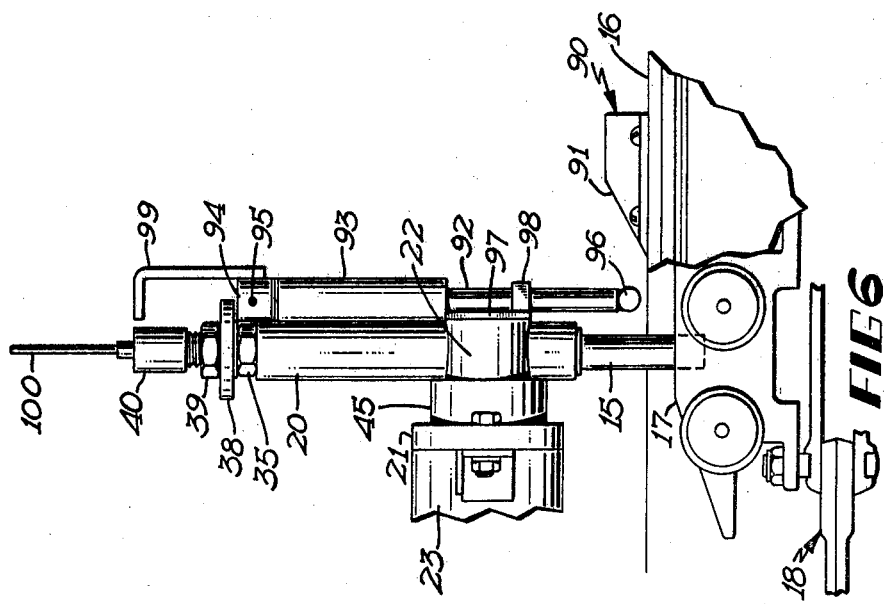
INVENTOR.
VERCOE C. JONES
BY
ATTORNEY United States Patent Office 3,479,665
Patented Nov. 18, 1969

3,479,665
SELF-CONTAINED ACCELERATION
CONTROL MECHANISM
Vercoe C. Jones, Faribault, Minn., assignor to Nutting Truck and Caster Company, Fairbault, Minn., a corporation of Minnesota
Continuation-in-part of application Ser. No. 683,041 Sept. 18, 1967. This application Apr. 10, 1969, Ser. No. 815,046
Int. Cl. B65g *17/42;* B61g *11/02*
U.S. Cl. 104—172                                   16 Claims

ABSTRACT OF THE DISCLOSURE

A self-contained acceleration control or overload release mechanism particularly adapted for use in coupling an industrial or material handling truck to a sub-floor drag line conveyor. The control mechanism is characterized by an elongated member pivotally mounted beneath the industrial truck for sliding movement relative to the industrial truck, along its longitudinal axis in the direction of travel of the truck. The elongated member serves to mount a tow pin which extends downwardly to engage a dog in the drag line conveyor. When a velocity differential occurs between the truck and the drag line conveyor, the elongated member slides forward against the compressive force of a spring and, if the differential continues to increase to reach an upper limit, the tow pin is released from the drag line. Release of the tow pin from the drag line is accomplished without a camming action by utilizing the vertical force component acting upon the mechanism.

Cross-reference to related application

The present application is a continuation-in-part of a copending application entitled "Acceleration Control Mechanism," filed Sept. 18, 1967, Ser. No. 683,041, which is itself a continuation-in-part of an application also entitled "Acceleration Control Mechanism," filed Aug. 13, 1965, Ser. No. 479,464 (now abandoned).

Background of the invention

The present invention relates to the field of coupling an industrial truck to a drag line conveyor, particularly in a warehousing operation, and compensating for velocity differential (acceleration) between the truck and the drag line.

In the use of conventional industrial tow line trucks, it is customary to couple the truck to a drag line conveyor running throughout out the factory in a track beneath the floor. The drag line is driven at a constant velocity since starting and stopping the drag line or varying its velocity to accommodate certain trucks at certain stations is not feasible. When industrial trucks are uncoupled from the drag line, for various purposes connected with the operation, and then recoupled to the drag line, with the drag line running at a constant velocity, substantial acceleration is imparted to the truck as it is picked up by the drag line.

The present invention provides a means of cushioning or compensating for the acceleartion, and releasing the industrial truck from the drag line in the event that the truck does not attain conveyor speed before a predetermined maximum force is applied or if the truck meets an obstacle. Thus the invention disconnects the tow pin when overload occurs and may also be characterized as an overload release mechanism as well as an acceleration and shock control mechanism.

A velocity differential also occurs when an industrial truck coupled to and moving at the velocity of the drag line strikes an obstruction. The obstruction may be other trucks partially diverted from the main line waiting to be pushed clear of the powered conveyor into non powered spurs by a truck connected to the main line. In the past, systems of this type have been limited in capacity because of the tremendous forces of the conveyor on the connected truck trying to instantaneously accelerate the stationary trucks to tow line speed. With the present invention heavy loads can be safely and efficiently accelerated without overloading the conveyor or overstressing the pushing cart. The present invention also serves to compensate for such deceleration and automatically releases the truck from the drag line in the event that the deceleration exceeds an upper limit.

In general, prior art devices have provided a positive camming action to force the tow pin in upwardly with respect to the drag line as the upper limit of acceleration force occurs. The provision of a positive camming action requires elements which increase the cost of the mechanism and which require maintenance. The present invention eliminates the positive camming elements and utilizes the vertical force component acting upon the mechanism to force the tow pin upwardly out of engagement with the drag line.

Moreover, acceleration control mechanisms of the prior art have not been self-contained and have required substantial connection of interrelation between the mechanism and the industrial truck. Control mechanisms of the prior generally require a mounting to the industrial truck at a number of points and are not easily removed and replaced.

Summary

The acceleration control mechanism which constitutes the present invention comprises a tow pin adapted to engage a drag line conveyor to thereby couple the mechanism, and consequently the industrial truck, to the drag line. An elongated member supports the tow pin which extends downwardly therefrom so that the drag line produces a vertical force component on the mechanism when the tow pin is engaged by the drag line. Means is provided for mounting the elongated member on the truck so that the elongated member may be moved horizontally relative to the truck to compensate for acceleration and so that one end of the elongated member may be moved vertically relative to the truck to release the tow pin from the drag line if the upper limit of velocity differential occurs. Means is provided for preventing the elongated member from moving vertically relative to the drag line until the elongated member reaches its fully extended position and means is provided for releasing the prevention means when the elongated member reaches its fully extended position thereby permitting one end of the elongated member to move upwardly relative to the truck and drag line, under the influence of the vertical force component, to thereby disengage the tow pin from the drag line.

The primary object of the present invention is to provide a self-contanied acceleration control mechanism which recognizes and utilizes the vertical force component on the tow pin to release the tow pin from the drag line when an upper limit of velocity differential or acceleration of the truck occurs.

Description of the drawings

FIGURE 1 is a perspective view of a material handling or industrial truck with the self-contained acceleration control mechanism mounted thereto. FIGURE 1 shows the tow pin of the acceleration control mechanism in engagement with a drag line which runs beneath the supporting floor in the track shown.

FIGURE 2 is a side view of the acceleration control mechanism which comprises the present invention and shows the tow pin in engagement with a dog in the drag line, and the position of the associated elements when little or no velocity differential exists between the truck and the drag line.

FIGURE 3 is a vertical sectional view taken on the line 3—3 of FIGURE 2 with the means for preventing the elongated member from moving vertically relative to the drag line in the locked or unreleased position.

FIGURE 4 is a side view of the acceleration control mechanism shown in FIGURE 2 with the tow pin in engagement with a dog in the drag line but with the elongated member extended against its biasing means, just prior to release of the tow pin from the drag line.

FIGURE 5 is a side view of the acceleration control mechanism and shows the position of the various elements immediately upon release of the tow pin from the drag line.

FIGURE 6 is a partial side view of an additional embodiment of the present invention which includes an additional feature, namely, means for disengaging the tow pin at desired points along the path of the drag line to stop each truck upon reaching the desired point without requiring the tow pin mechanism to extend to its overload release position.

FIGURE 7 is a front view of the tow pin disengaging means shown in FIGURE 6.

Description of preferred embodiments

The general nature of the preferred embodiment may be readily understood with reference to FIGURES 1 and 2. Acceleration control mechanism 10, shown in FIGURE 2 is mounted beneath the front of industrial truck 11. Industrial truck 11 includes a floor 12, a bumper 13 and wheels 14. Acceleration control mechanism 10 includes tow pin 15 which is shown in FIGURE 1 projecting into track 16 to engage dog 17, shown in FIGURE 2, which is mounted to drag line 18. With tow pin 15 so engaged, truck 12 is moved at the velocity of drag line 18 and track 16 serves to guide tow pin 15 during the course of such travel.

Tow pin 15 is slidably mounted in sleeve 20 which extends through and is welded to elongate member 22. Elongate member 22 is slidably mounted in cylindrical housing 23. Elongate member 22 includes a collar (not shown) which engages one end of spring 24 to cause compression thereof when elongate member 22 is moved to the right, as viewed in FIGURE 2, with respect to housing 23.

The acceleration control mechanism shown in FIGURE 2 is mounted to truck 11 by means of angles 25 and plates 26 which are in turn mounted to angle 27 which is a part of the frame on industrial truck 11 immediately beneath floor 12. Angles 25 are secured to cylinder 23 at one end thereof and provide mounting for end cap 30.

The other end of cylindrical housing 23 rests or is cradled between plates 26 through the provision of bottom plate 31 best seen in FIGURE 3, which is secured to plates 26 through angles 32.

The connection of the left end of cylindrical housing 23, as viewed in FIGURE 2, to industrial truck 11 through angles 25 at angle 27, is a pivotal connection. Thus cylindrical housing 23 and elongated member 22, when released from the cradle position shown in FIGURE 2 and FIGURE 3, is free to pivot in a counter-clockwise direction, as viewed in FIGURE 2, about the axis of pin 33, with respect to truck 11. This pivotal movement may be seen by comparing FIGURE 2 with FIGURE 5.

Thus, when an upper limit of velocity differential or overload exists between drag line 18 and industrial truck 11, elongated member 22 moves from the retracted position of FIGURE 2, against the compressive force of spring 24 into the extended position of FIGURE 5. As described more particularly below, cylindrical member 23 is released and allowed to pivot upwardly about the axis of pin 33 to thereby allow tow pin 15 to disengage from dog 17 of drag line 18.

With the foregoing general description of the design and operation of the present invention, the following detailed description of the various elements thereof may be readily understood.

With reference to FIGURE 2, tow pin 15 is slidably mounted in sleeve 20 and assumes the position shown in FIGURE 2 by gravity. In other words, tow pin 15 is merely seated in sleeve 20 with nut 35, threaded to the upper end of tow pin 15 in abutting relationship with the top of sleeve 20. An upper bearing surface 36 and a lower bearing surface 37 at opposite ends of sleeve 20 serve to engage tow pin 15. Disc 38 is also mounted to the upper end of tow pin 15 by means of nut 39. Nut 35 and 39 serve as a means for mounting disc 38 and adjusting the penetration of tow pin 15 into dog 17 of conveyor 18. Cap 40 is pinned to the upper end of tow pin 15 and serves as a means for mounting chain 41. Chain 41 provides a means for lifting tow pin 15 upwardly with respect to drag line 18 and sleeve 20, to disengage tow pin 15 from drag line 18 when desired by an operator. Thus industrial truck 11 may be conveniently disengaged from drag line 18 at the will of the operator for any desired purpose.

It should be noted that when tow pin 15 is in engagement with dog 17 of drag line 18, with drag line 18 moving, frictional forces between tow pin 15 and bearing surfaces 36 and 37 prevent upward sliding movement of tow pin 15 with respect to sleeve 20.

Elongated member 22 includes a collar (not shown) located at tthe left end and inside of cylindrical housing 23 as viewed in FIGURE 2, which serves to abut spring 24. A second collar 45, best seen in FIGURES 4 and 5 is formed on the opposite end of elongated member 22 to insure compressive loading of housing 23 by the force of spring 24 as collar 45 contacts end cap 21 and to prevent complete withdrawal of elongated member 22 into cylindrical housing 23 under the influence of spring 24. Elongated member 22 is slidable in cylindrical housing 23 from the retracted position shown in FIGURE 2, against the compressive force of spring 24 to the extended position shown in FIGURES 4 and 5, and consists of a heavy tubular member best seen in FIGURE 3.

As described generally above, acceleration control mechanism 10 is mounted for limited pivotal movement about the axis of pin 33 beneath truck 11. Means is provided for preventing such pivotal movement and is shown generally at 46 in FIGURES 2 and 3. The means for preventing pivotal movement about the axis of pin 33 includes latch 47 formed of two short angles with transversely extending rod 48 welded thereto. Latch 47 is pivotally mounted to upstanding bracket 49 which is welded to the top of cylindrical housing 23 and which includes tubular portion 50. Latch support 47 is pivotally mounted to bracket 49 by means of connector 51 which extends through tubular portion 50 of upstanding bracket 49. Latch support 47 is therefore mounted for pivotal movement between the two positions shown in FIGURES 2 and 5.

Return spring 52 is also an element in the means for preventing pivotal movement of elongated member 22 and cylindrical housing 23. Spring 52 is mounted to cylindrical housing 23 at bracket 53 and is mounted to latch support 47 at bracket 54 to urge latch 47 into the position shown in FIGURES 2 and 3.

Rod 48 includes latch rollers 55 rotatably mounted on each end thereof and retained by screws 57. Latch rollers 55 engage the upper surface of notches 56 which are provided in the forward edge of side plates 26, to thereby prevent upward pivotal movement of cylindrical housing 23 about the axis of pin 33. Thus, transversely extending rod 48 of prevention means 46 prevents elongated member 22 from moving vertically relative to drag line conveyor 18 when elongated member 22 is in the retracted position shown in FIGURE 2, and while the elongated member moves from the retracted position of FIGURE 2 to the extended position of FIGURE 4.

The means for releasing prevention means 46 when elongated member 22 moves through the extended position shown in FIGURE 4 to the position shown in FIGURE 5, may be best seen in FIGURES 2, 4 and 5. The releasing means 60 is characterized by rod 61 which extends nearly the full length of cylindrical housing 23 and is slidably mounted in spaced parallel relationship thereto in sleeves 62 and 63 which are welded to cylindrical housing member 23. Collars 64 and 65 are mounted to rod 61 to serve as means for limiting its sliding movement. Spring 66, which abuts sleeve 62 on one end and collar 65 on the end, serves to urge rod 61 into the position shown in FIGURE 2, with collar 64 abutting sleeve 63.

The right end of rod 61, as viewed in FIGURE 2, abuts latch support 47. The left end of rod 61 is provided with adjusting bolt 70 which is threaded to rod 61, and retaining nut 71 which is in turn threaded to adjusting bolt 70. Together bolt 70 and nut 71 serve as means for adjusting the effective length of rod 61.

As elongated member 22 reaches the extended position shown in FIGURE 4, abutment flange 72 engages the head of bolt 70. Further extension of elongated member 22 causes abutment flange 72 to push rod 61 to the right as viewed in FIGURE 2, against the compressive force of spring 66, to thereby "kick out" or release latch support 47. The release of latch support 47 occurs as rod 61 causes latch support 47 to pivot about the axis of connector 51 to thereby release rollers 55 from engagement with notches 56 of side plates 26. Elongated member 22 and cylindrical housing 23 is then free to pivot upwardly about the axis of pin 33 to thereby disconnect tow pin 15 from drag line conveyor 18. This upward pivotal movement upon release of prevention means 46 is caused by the force couple on sleeve 22 in housing 23 resulting from the conveyor dog force on tow pin 15.

The vertical force component is a result of the design of acceleration control mechanism 10. Since a substantial lever arm exists between the point of attachment to industrial truck 11 represented by pin 33, to the point of application of force of drag line conveyor 18 on tow pin 15, there is a substantial moment in a counterclockwise direction about the axis of pin 33. This moment is resisted by latch means 47.

Upon release of tow pin 15 from drag line conveyor 18, as shown in FIGURE 5, elongated member 22 retracts or withdraws into cylindrical housing 23 under the substantial influence of spring 24. One-way shock absorber 80 is provided to prevent unrestrained retraction of elongated member 22 by spring 24. One-way shock absorber 80 is of conventional design and includes cylinder 81 and rod 82. Rod 82 is mounted to collar 73 of elongated member 22 through collar 83 on bolt and nut 84. Thus rod 82 reciprocates or slides with elongated member 22. Cylindrical portion 81 of shock absorber 80 is mounted to the upper surface of cylindrical member 23 by means of bracket 85. One-way shock absorber 80 provides no restraint upon elongated member 22 as it moves from the position shown in FIGURE 2 to the position shown in FIGURE 4. When elongated member 22 is released from the extended position as tow pin 15 disengages from drag line 18, however, shock absorber 80 provides substantial restraint against the expansion of spring 24. Thus elongated member 22 is caused to retract in a restrained manner to thereby prevent the generation of substantial impact forces and noise as collar 45 engages end cap 21 of cylindrical housing 23. One-way shock absorber 80 also serves to cushion or dampen the influence of spring 24 during operation of acceleration control mechanism 10 when the truck velocity reaches the conveyor velocity, to prevent overspeed of the truck as elongated member 22 returns to its first position as a result of the great reduction in force required for the truck to sustain conveyor velocity.

With reference to FIGURES 6 and 7, means is shown for disengaging the tow pin at desired points along the path of the drag line to stop each truck upon reaching the desired point, without requiring the tow pin mechanism to extend to its overload release position. Thus industrial truck 11 may be stopped automatically at points along drag line conveyor 18 for various purposes such as transfer from a spur line to a main line, loading and unloading, or for accumulation or staging of industrial trucks for any desired purpose.

For that purpose, one or more cams 90 may be positioned with respect to drag line conveyor 18 on one or both sides of track 16. Cam 90 includes cam surface 91 which is disposed downwardly in a direction opposite to the direction of travel of drag line conveyor 18. Cam release pin 92 is slidably or reciprocably mounted in sleeve 93 which is welded to the front of sleeve 20 with its axis parallel to and spaced therefrom. Collar 94 is pinned by means of pin 95 to the upper end of cam release pin 92 which protrudes above sleeve 93. The lower end of cam release pin 92 is provided with cross bar 96 which is welded thereto and extends transversely to the direction of travel of drag line conveyor 18 to engage cam 90 on one or both sides of the track 16, as best seen in FIGURE 7. Cross bar 96 may vary in length depending upon the positioning of cams 90. Plate 97 is welded to elongated member 22 to provide a plane vertical surface for engagement by angle 98 which is welded to cam release pin 92. Angle 98 engages plate 97 and prevents rotation of cam release pin 92 about its longitudinal axis. Cross bar 96 is therefore held in a position which extends transversely across track 16. Angle 98 also defines the upper limit of stroke of cam release pin 92 as it engages the lower end of sleeve 93. Cam release pin 92 is provided with a flanged extension 99, described more particularly below, which is welded to collar 94 and extends upwardly therefrom. It should be noted that cam 90 may be mounted to be retractable beneath the floor surface and extendable into an operative position above the floor surface by manual or remote control means.

When industrial truck 11 approaches cam 90, cross bar 96 engages camming surface 91 and continued movement of industrial truck 11 causes cross bar 96 to ride up on camming surface 91. Cam release pin 92 consequently slides upwardly in sleeve 93 and, as best seen in FIGURE 6, abuts disc 38 to raise tow pin 15 upwardly to disconnect it from dog 17. Thus tow pin 15 is disconnected from drag line conveyor 18 by cam 90 without requiring acceleration control mechanism 10 to extend to its overload release position.

As described above, tow pin 15 may be disengaged from dog 17 of drag line conveyor 18 by release of acceleration control mechanism 10 when overload occurs, or by release under the influence of cam release pin 92 when tow pin 15 and truck 11 meet cam 90. Tow pin 15 may also be disconnected from dog 17 at the will of the operator by pulling chain 41 shown in FIGURES 2–5 or cable 100 shown in FIGURES 6 and 7. Chain 41 or cable 100 therefore provide a convenient means for the operator to disconnect tow pin 15 from dog 17 at any point along the path of drag line conveyor 18.

When tow pin 15 is disconnected as a result of overload, it may be retained in the raised released position and does not fall back down to reengage another dog 17. Mechanism is provided for retaining tow pin 15 in the disengaged position but may be omitted if it is desired to have tow pin 15 drop under the influence of gravity to promptly reengage an approaching dog 17 to continue trying to move the obstacle.

This retaining means 101 is best seen in FIGURE 1. Angles 102 are mounted on opposite sides of sleeve 20 with the horizontal leg thereof pointing toward sleeve 20 and extending in the direction of travel of truck 11. Angles 102 thus serve to provide a guide for sleeve 20 to prevent pivotal movement about the axis of elongated member 22 while, at the same time, allowing sleeve 20 to slide smoothly between the edges of the horizontal legs without bending. Angles 102 also serve as a means for mounting hinged camming plate 103. Hinged camming plate 103 extends downwardly and forwardly as shown in FIGURE 1 and overlaps or is overlapped by disc 38. When tow pin 15 is released as a result of overload on acceleration control mechanism 10, disc 38 slides forwardly out from under cammed hinge plate 103. After release and upon rearward movement of elongated member 22 and tow pin 15, disc 38 rides up on hinge cam plate 103 and is held in a raised position thereon. When tow pin 15 is disengaged as a result of operator release by pulling chain 41 or cable 100, hinged cam plate 103 is caused to pivot about its hinge axis and falls downwardly into the position shown in FIGURE 1 after disc 38 passes above it. Disc 38 and pin 15 are then held in the raised position with disc 38 on top of or above hinged cam plate 103.

To release tow pin 15 to allow it to fall downwardly and reengage an approaching dog 17, cammed hinged plate 103 is merely caused to pivot about its hinged axis to move out from under disc 38. Disc 38 is then free to drop downwardly and allow tow pin 15 to be engaged by an approaching dog 17.

It should be noted with reference to FIGURES 6 and 7, that flanged extension 99 is engaged by disc 38 and lifts cam release pin 92 upwardly to keep cross bar 96 from striking obstacles during manual maneuvering of truck 11. Thus cam release pin 92 may be held in a raised position when desired. Flanged extension 99 also serves to limit the upward stroke of tow pin 15. This upper limit is reached when angle 98 engages the lower end of sleeve 93 and disc 38 engage flanged extension 99.

It may be noted that cylindrical housing 23 may be cradled between plates 26 as shown in FIGURE 3, or as shown in FIGURE 7. With reference to FIGURE 7, shims 105 may be selectively inserted between bottom plate 31 and cylindrical housing 23 to permit adjustment of the position of cylindrical housing 23 for proper latching. Shims 106 may also be provided, as shown in FIGURE 3, between angles 32 and bottom plate 31.

In the prefered embodiment shown which is adapted for use with a drag line conveyor running at a speed of approximately 90 feet per minute, spring 24 is chosen with a spring constant and expanded length to provide approximately 150–200 pounds dead load with elongated member 22 in the position shown in FIGURE 2, and to require approximately 1200 pounds for release shown in FIGURE 5. In the embodiment shown approximately 750 foot-pounds must be applied to spring 24 to release acceleration control mechanism 10. It should be recognized that the length and spring constant of spring 24 may vary considerably depending upon the condition under which acceleration release mechanism 10 is to be used. For example, units have been constructed which provide 600 pounds pre-load (or dead load), 14 inches of travel or stroke and overload release at 2400 pounds. This range of use may include various drag line speeds in the range of 60 to 120 feet per minute and, of, course, it may also include use under vastly varying truck sizes and loaded weights.

Operation

The overall operation of the present invention may be understood with reference first to FIGURES 2, 4 and 5. When a velocity differential occurs between truck 11 and drag line conveyor 18, and the velocity differential is less than the upper limit or overload release level, spring 24 merely contracts and gradually, under the dampening action of shock absorber 80, expands to cushion the effect of the differential.

When a substantial velocity differential occurs and approximately 1200 pounds is applied to acceleration control mechanism 10 by tow pin 15, spring 24 is caused to contract, as elongated member 22 extends from cylindrical housing 23, as shown in FIGURE 4. As abutment flange 72 engages adjusting bolt 70 of rod 61, further extension of elongated member 22 causes rod 61 to slide forward against the compression of spring 66 to "kick-out" or release latch support 47 causing it to pivot into the position shown in FIGURE 5, to thereby release cylindrical housing 23. Cylindrical housing 23 is then free to pivot upwardly about the axis of pin 33 under the influence of the vertical force component acting upon tow pin 15, to allow tow pin 15 to disengage from dog 17 as shown in FIGURE 5. Elongated member 22 is then free to retract under the influence of spring 24, dampened by one-way shock absorber 80, until collar 45 engages end cap 21 of cylindrical housing 23. As elongated member 22 retracts disc 38 rides up on hinged cam plate 103 to hold tow pin 15 in a raised disconnected position, even though cylindrical housing 23 and elongated member 22 drop downwardly, under the influence of gravity, to reassume the position shown in FIGURE 2. As elongated member 22 retracts and cylindrical housing 23 drops, abutment flange 72 moves out of engagement with adjusting bolt 70 and rod 61 moves to the left, as viewed in FIGURE 2, under the influence of spring 66, and return spring 52 returns latch support 47 into the position shown in FIGURE 2.

Adjusting bolt 70 may be threaded into or out of rod 61 to thereby adjust the effective length of rod 61 to adjust the release or "kick-out" level of acceleration control mechanism 10.

With reference to FIGURES 6 and 7, as tow pin 15 and industrial truck 11 approach and engage cam 90, cam release pin 92 is cammed upwardly to thereby lift tow pin 15 out of engagement with dog 17. The distance that cam release pin 92 is cammed upwardly is chosen so that disc 38 is raised enough to disengage tow pin 15 from dog 17 but not enough to allow disc 38 to clear hinged cam plate 103. Consequently, when tow pin 15 is disengaged as a result of the camming action of cam 90, it is free to drop downwardly as cam 90 is dropped or as truck 11 is manually moved forward, and is not retained in the raised or disengaged position.

Tow pin 15 can, of course, be deliberately disengaged from dog 17 by pulling upwardly on chain 41 or cable 100 at any point along the path of travel of truck 11. Chain 41 or cable 100 is customarily placed on a hook or reeled upwardly to thereby retain tow pin 15 in the manually raised position above the floor surface. Cam release pin 92 is also held in a raised position by engagement of flanged extension 99 by disc 38.

Tow pin 15 may be released from the raised position to thereby drop into engagement with an approaching dog 17 by merely releasing chain 41 or cable 100 and by flipping hinged cammed plate 103 about its hinged axis to allow disc 38 to drop downwardly past hinged cam plate 102 toward angles 102.

Thus the present invention provides an economical, efficiently operating, self-contained acceleration control mechanism particularly useful in warehousing operations. The invention may also be embodied in other forms for use under other conditions without departing from the spirit or central characteristics thereof. The present embodiment is thus to be considered in all respects as illustrative and not restrictive, the scope of the invention being indicated by the appended claims.

Having thus described the invention, the following is claimed:

1. A material handling device having an improved acceleration control mechanism mounted thereon, the mechanism comprising:

a tow pin adapted to engage a movable drag line to thereby connect the mechanism to the drag line;

an elongated member having means on one end thereof for supporting the tow pin so that the drag line produces a vertical force component on the mechanism when the tow pin is in engagement with the drag line;

means for mounting the elongated member on the device so that the one end of the elongated member may be moved vertically relative to the device and so that the elongated member may be moved horizontally relative to the truck from a first position, to a second position spaced from the first position in the direction of travel of the drag line with the tow pin engaged by the drag line as the elongated member moves from the first position to the second position;

means for preventing the elongated member from moving vertically relative to the drag line when the elongated member is in the first position and as the elongated member moves from the first position to the second position; and means for releasing the prevention means when the elongated member moves through the second position thereby permitting the one end of the elongated member to move vertically relative to the drag line under the influence of the vertical force component to disengage the tow pin from the drag line.

2. The material handling device of claim 1 and first biasing means cooperating with the elongated member for biasing the elongated member toward the first position.

3. The material handling device of claim 1 wherein the prevention means includes a latch mounted for pivotal movement relative to the elongated member between one position in which the latch prevents said vertical movement of the one end of the elongated member and another position in which the latch releases said elongated member for vertical movement of the one end.

4. The material handling device of claim 3 wherein the releasing means moves the latch from the one position to the other position.

5. The material handling device of claim 3 wherein the elongated member carries means for causing the releasing means to move the latch means from the one position to the other position.

6. The material handling device of claim 3 wherein:
the releasing means includes a rod positioned so that its longitudinal axis is substantially parallel to the longitudinal axis of the elongated member and so that the one end of the rod is positioned adjacent to the latch means and the other end of the rod extends toward the other end of the elongated member; and
wherein the elongated member has an abutment means mounted thereon adjacent to its other end and positioned so that when the elongated member is moved to the second position the abutment means contacts the other end of the rod and causes the one end of the rod to contact and move the latch means from the one position to the other position, to thereby release the elongated member for vertical movement.

7. The material handling device of claim 1 wherein:
a housing is positioned about a portion of the elongated member so that the elongated member may move relative to the housing and so that when the elongated member is in the first position, the one end of the elongated member is adjacent to one end of the housing and the other end of the elongated member projects from the other end of the housing;
the mounting means connects the other end of the housing with the device so that the one end of the housing and thus the one end of the elongated member may pivot about the mounting means; and
a saddle member supports the one end of the housing.

8. The material handling device of claim 7 and latch means mounted to the prevention means for pivotal movement relative to the elongated member between one position in which the latch means cooperates with the housing to prevent said vertical movement of the one end of the elongated member and in another position in which the latch means is ineffective to prevent vertical movement of the one end of the elongated member.

9. The material handling device of claim 8 wherein:
the releasing means includes a rod mounted on the housing and positioned so that its longitudinal axis is substantially parallel to the longitudinal axis of the elongated member, and so that the one end of the rod is positioned adjacent to the latch means and the other end of the rod extends toward the other end of the elongated member; and
the elongated member has an abutment means mounted thereon adjacent to its other end and positioned so that when the elongated member is moved to the second position, the abutment means contacts the other end of the rod and causes the one end of the rod to release the latch means.

10. The material handling device of claim 9 and first biasing means positioned in the housing and about the portion of the elongated member the first biasing means biasing the elongated member toward the first position.

11. The material handling device of claim 9 and biasing means positioned outside the housing and about the portion of the elongated member, said biasing means biasing the elongated member toward the first position.

12. The material handling device of claim 9 and biasing means positioned in and outside of the housing and about the elongated member, said biasing means biasing the elongated member toward the first position.

13. The material handling device of claim 10 and second biasing means for biasing the latch means to the one position.

14. The material handling device of claim 13 and third biasing means for biasing the release means to the one position.

15. The material handling device of claim 1 and release means mounted to move with the elongate member, operatively associated with the tow pin, and adapted to engage a camming surface to thereby disengage the tow pin from the drag line.

16. The material handling device of claim 15 wherein said release means includes a vertical slidable pin attached to engage the camming surface to slide upwardly to thereby disengage the tow pin from the drag line.

References Cited

UNITED STATES PATENTS

| | | | |
|---|---|---|---|
| 3,015,284 | 1/1962 | Klamp | 104—172 |
| 3,094,944 | 6/1963 | Bradt et al. | 104—172 |
| 3,148,634 | 9/1964 | Goodrich | 104—172 |

ARTHUR L. LA POINT, Primary Examiner

R. SAIFER, Assistant Examiner

U.S. Cl. X.R.

267—138